United States Patent
Savant

(10) Patent No.: US 6,692,366 B1
(45) Date of Patent: Feb. 17, 2004

(54) CV JOINT PROTECTOR FOR ATV

(76) Inventor: Kevin Savant, P.O. Box Drawer 520, Kinder, LA (US) 70648

(*) Notice: Subject to any disclaimer, the term of this patent is extended or adjusted under 35 U.S.C. 154(b) by 0 days.

(21) Appl. No.: 10/243,546

(22) Filed: Sep. 14, 2002

(51) Int. Cl.[7] .............................................. F16D 3/84
(52) U.S. Cl. ........................ 464/170; 74/608; 74/609; 74/612
(58) Field of Search ................... 464/170; 74/608, 74/609, 612

(56) References Cited

PUBLICATIONS

Yamaha Motor Corporation, USA—Grizzly, Rear A–Arm Skid Plates–Aluminum, [online], [retrieved on Sep. 26, 2003]. Retrieved from the Internet: <URL: http://www.yamaha–motor.com/accessories/AcSCItemDetail,asp?lid=3&cid=10&mid=48&connavid=378&sconnavid=1998&Year=All &conid=58 pid=l>.*

DG A–Arm Guards for Honda, Web Page, Copyright 2002 by MotocycleUSA.com Inc., USA.

Cycle Country CV Boot Protectors, Web Page, Copyright 1998–2000 by Diversified Sports Productd, Inc, USA.

Arctic Cat CV Joint Protectors, Web Page, Fiser Truck & Tractor, Inc. USA.

* cited by examiner

*Primary Examiner*—Lynne H. Browne
*Assistant Examiner*—Aaron Dunwoody
(74) *Attorney, Agent, or Firm*—Robert N. Montgomery

(57) ABSTRACT

An improved protective shield for attachment to the A-arms of an ATV for preventing the intrusion of debris that may damage the suspension or CV joint. The improvements enhance the shield's ability to reduce debris build up and to be more easily cleaned by suspending the shield below the suspension members and providing washout and drainage holes.

11 Claims, 3 Drawing Sheets

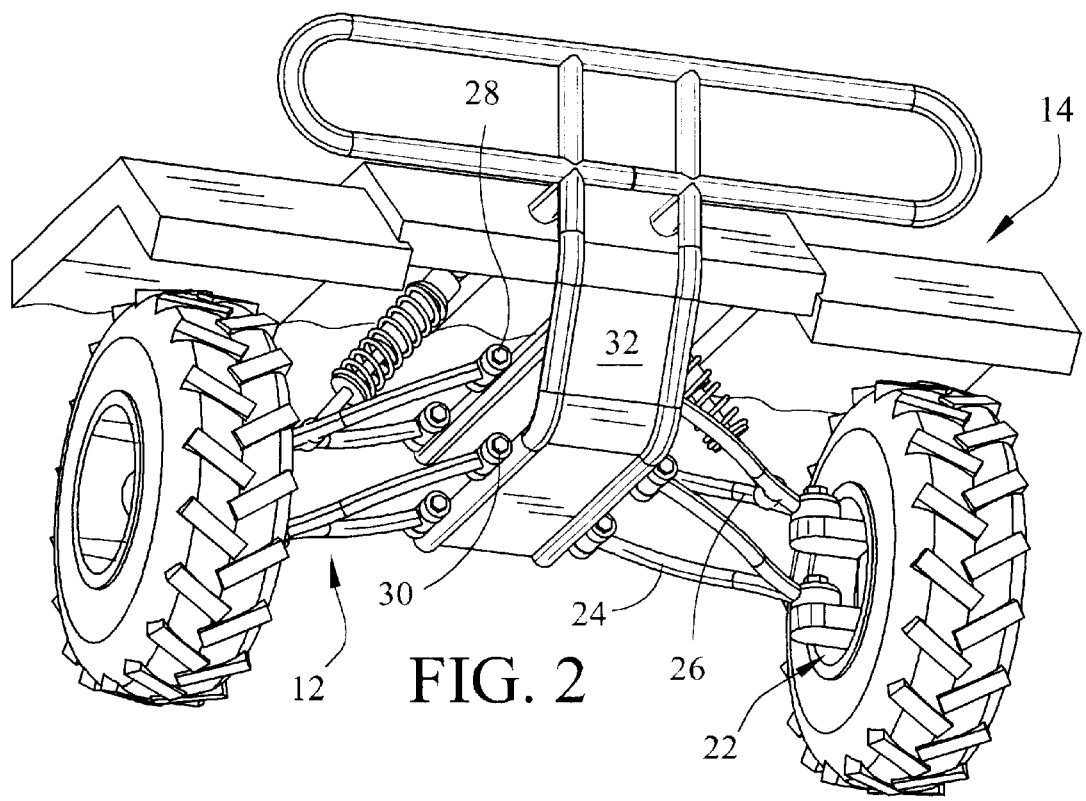
FIG. 2
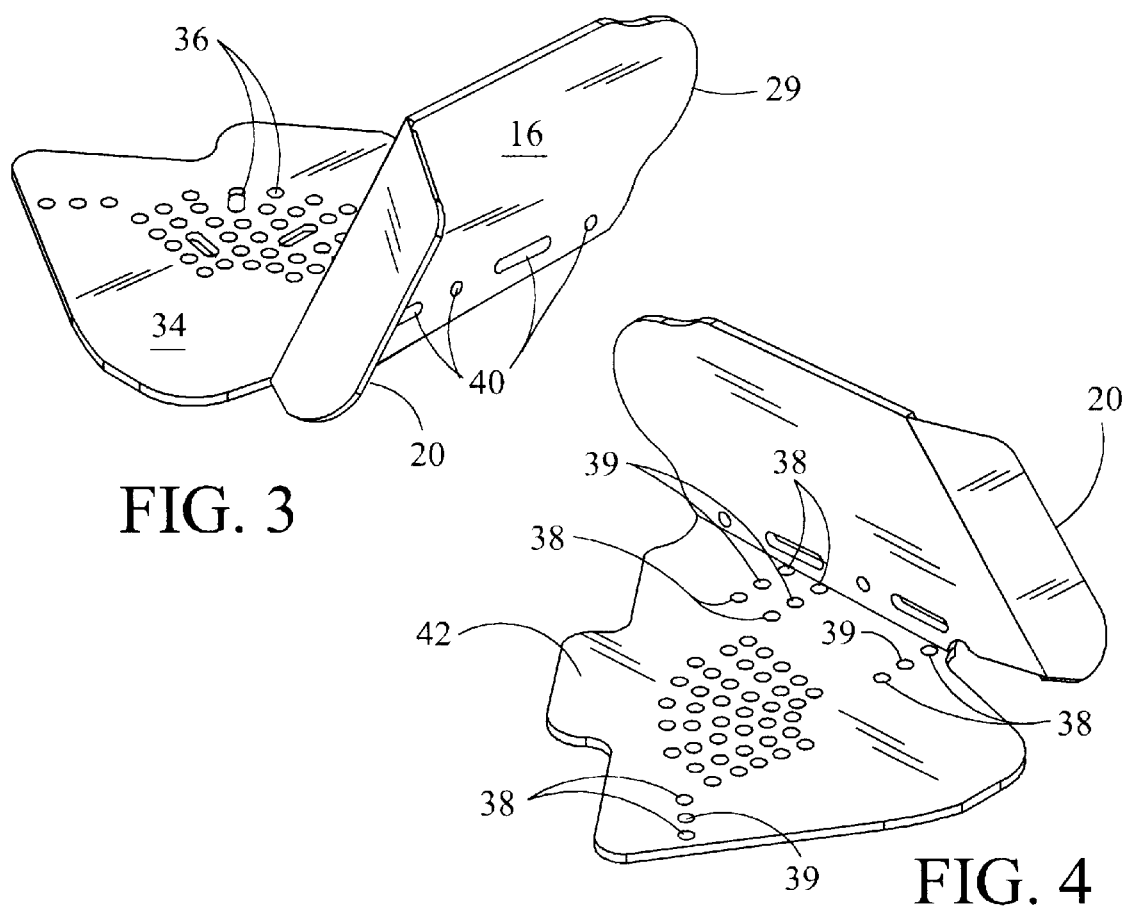
FIG. 3
FIG. 4

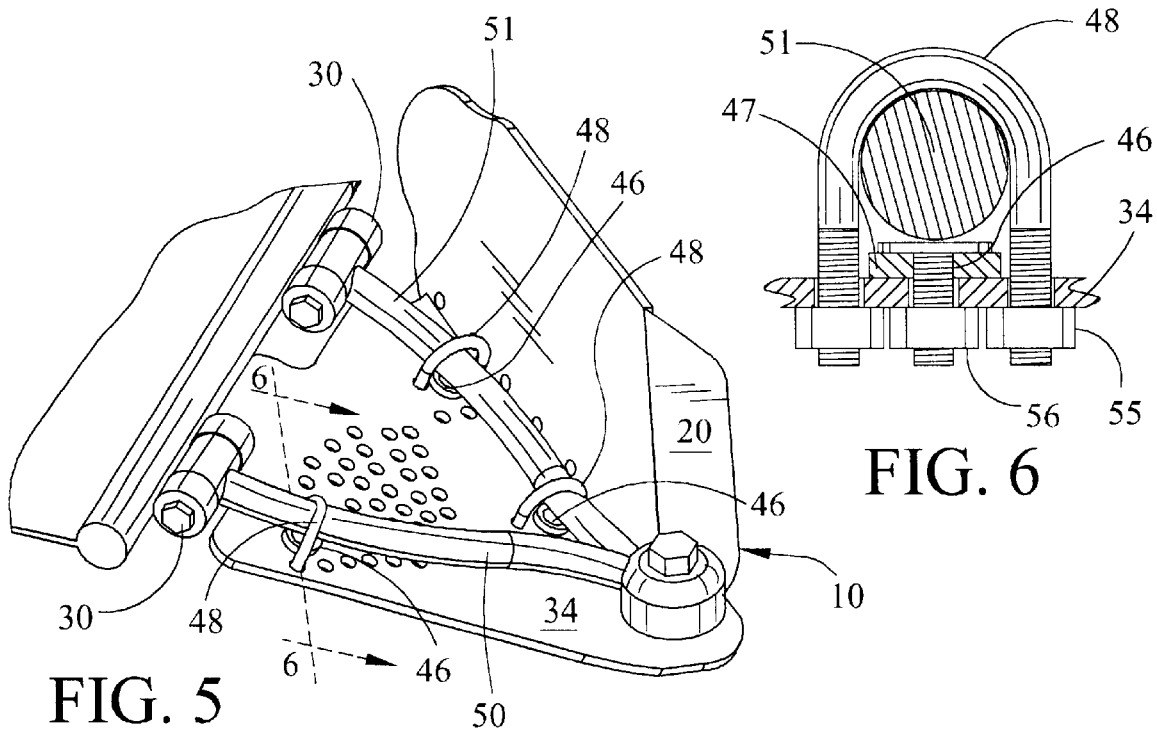
FIG. 5
FIG. 6
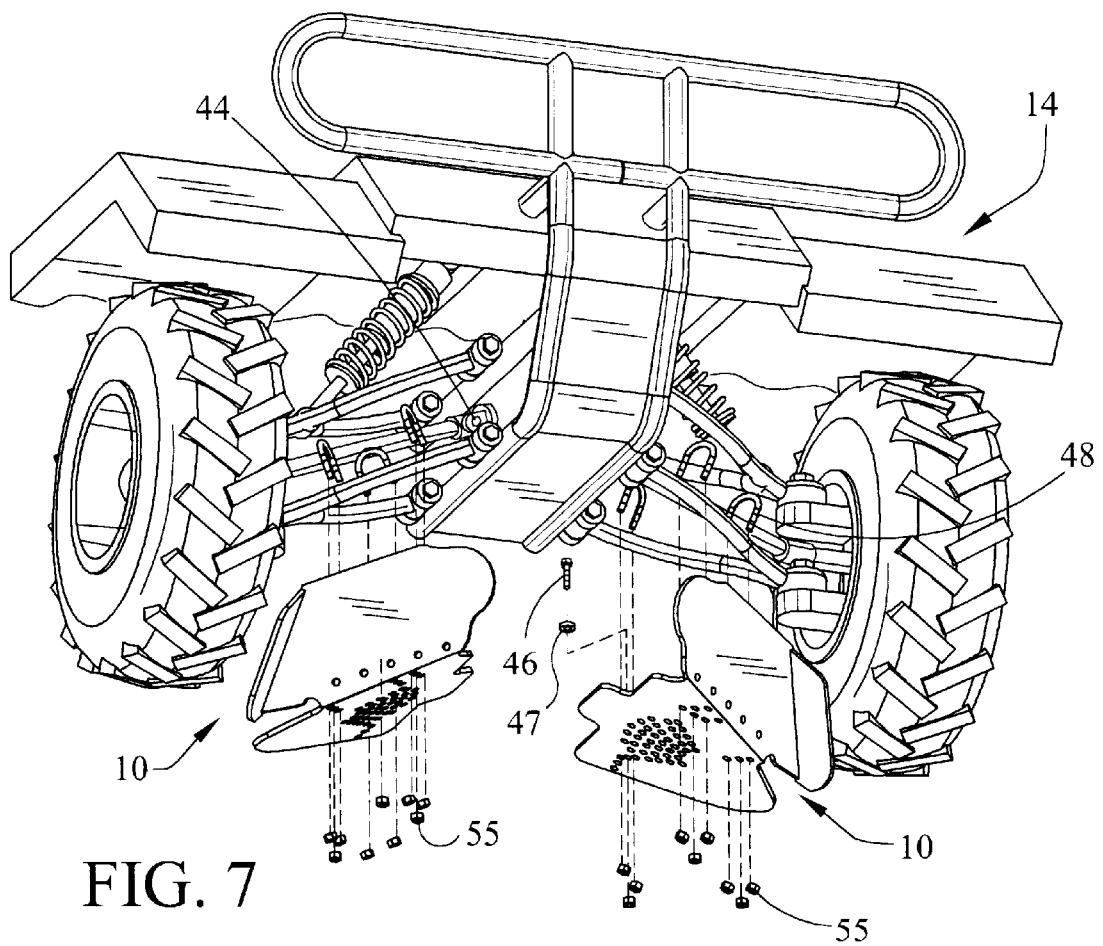
FIG. 7

CV JOINT PROTECTOR FOR ATV

1. FIELD OF THE INVENTION

This invention relates generally to guards and shields for add-on attachment to All Terrain Vehicles (ATV) and more particularly to a shield for protecting the constant velocity joint of a drive shaft extending through the independent A-arm suspension of such vehicles.

2. GENERAL BACKGROUND

All terrain vehicles (ATV) are largely abused by riders traveling over very rough terrain at high speed, thereby subjecting the vehicle to high stress. Most such vehicles are constructed of tubular frames for lighter weight. However, such tubular construction provides large openings for intrusion by debris, such as sticks and rocks. Such debris often bends the tubing or becomes wedged in the frame, sometimes even locking up steering and damaging drive shafts and suspension arms. Most vulnerable are the constant velocity (CV) or universal joints connecting the drive shafts to the wheels passing through the independent suspension A-arms. These CV joints are generally exposed and protected only by a flexible rubber cover. Most ATV manufacturers do not provide guards or shields to prevent the intrusion of debris into the A-arm. However, such guards and shields are sold as accessories for each type and model of ATV by after-market manufacturers. The need for such shields is well known within the art and various types of shields have been produced with universal mounting arrangements that adequately protect the CV joint and A-arm from intrusive debris. However, such shields have been found to create additional problems that tend to explain why the ATV manufacturers do not install them as original equipment. First, the shields accumulate mud and brush, which hardens and builds up around the drive shaft, thereby reducing flexibility if not kept clean. Some of the shields are made in such a way as to make cleaning very difficult, such as those having three sides. Second, the shields are often clamped directly to the A-arms themselves in a manner whereby the A-arms are in longitudinal contact with the shield thus trapping mud and moisture and the like, thereby inducing rust, where metal shields are used. Although non-metal shields are also available and do not rust, they are more vulnerable to hazards such as rocks and stumps. Therefore, it is an object of this invention to provide an A-arm shield for protecting the CV joints of an ATV having an improved method of self-cleaning to prevent accumulations of debris in the A-arm.

3. SUMMARY OF THE INVENTION

The invention described herein is a protective shield for attachment to the A-arm of an ATV for preventing the intrusion of debris that may damage the suspension or CV joint, the shield having improvements that enhance the shield's ability to reduce debris build up and to be more easily cleaned. The improvements further enhance the shield's ability to reduce debris build up by suspending the shield below the suspension members and providing washout and drainage holes.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 2 is an isometric view of a typical ATV with no A-arm shields;

FIG. 3 is a right side isometric view of the A-arm shield;

FIG. 4 is a left side isometric view of the A-arm shield;

FIG. 5 is an isometric view illustrating the attachment of the A-arm shield to the A-arms;

FIG. 6 is a cross section view taken along sight lines 6—6 as show in FIG. 5.

FIG. 7 is an isometric expanded view illustrating the location and mounting arrangement of the A-arm shields.

5. DETAILED DESCRIPTION OF THE PREFERRED EMBODIMENT

Figure 1:
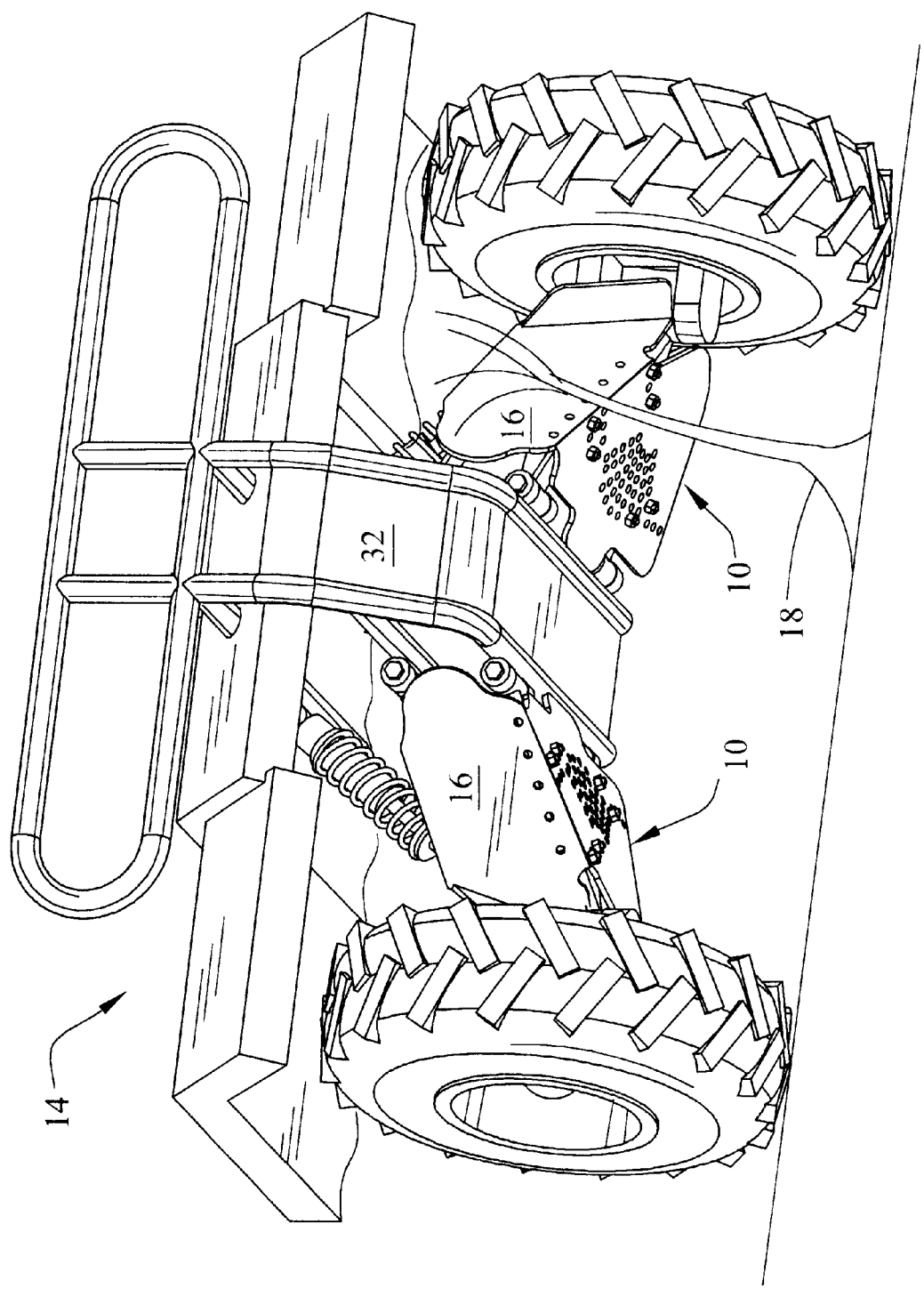
FIG. 1 is an isometric view of an ATV with the preferred embodiment of the A-arm shield described herein as typically installed on the vehicle.

As illustrated in FIG. 1 the improved A-arm protective shields 10 are configured to attach to the front or rear independent suspension A-arms 12 seen in FIG. 2 of most All terrain vehicles (ATV) 14. The front or leading face 16 of the shield, as seen in FIG. 3, is located in front of the A-arm assembly 12 to provide deflection of brush 18 and the like as seen in FIG. 1. The deflector face 20, seen in FIG. 3, is bent at an angle consistent with the convergence of the A-arms 12 and their connection with the wheel assembly 22, seen in FIG. 2, and extends a sufficient distance to deflect debris from entering the space between the upper and lower A-arm suspension members 24,26 as shown in FIG. 2 and as seen in place in FIG. 1. Likewise, the opposite end 29 of the face plate 16 is rounded or radiused to project between the A-arm suspension member connection points 28,30, seen in FIG. 2 and shown in place in FIG. 1, to prevent intrusion of debris adjacent the main frame assembly 32. The mounting plate or base portion 34 of the A-arm shield 10 seen in FIG. 3 is perforated with a plurality of openings 36 in addition to a plurality of mounting holes 38 provided for U-bolt insertion and attachment to the lower A-arms 24. The openings 36 located in the base portion 34 in conjunction with a row of openings 40 located along the lower portion of the leading face 16 seen in FIG. 3 provide washout capability. The mounting plate portion 34 is configured to cover the space between the A-arms and includes a tab portion 42 that extends between the arm connection points 30 adjacent the main frame 32, thereby effectively closing any opening to the A-arm and thus providing protection for the drive shaft and CV joint 44 seen in FIG. 7. Looking now at FIG. 5, it should be noted that a spacer 46 is provided, located between the legs of the U-bolts 48, utilizing mounting holes 39 as seen in FIG. 4. U-bolts 48 are then located as appropriate in holes 38 provided to secure the protective shields 10 to the A-arms 50,51, as seen in FIG. 5. As seen in cross section in FIG. 6, the spacer 46 may be a threaded stud having a large head or washer 47 located between the base portion 34 and the A-arm suspension members 50,51 and secured by a nut 56. The spacers 46 may be interspersed at any place along the path of the suspension arms 50,51 but preferably between each of the mounting holes 38, as seen in FIG. 4. The spacers 46 allows water, mud, etc., to pass in though the openings 40 along the lower portion of the leading face 16 of the shield, flow around and under the forward most A-arm 51, and drain out of the drainage holes 36. This arrangement prevents the build-up of debris between the forward A-arm 51 and the front or leading face portion 16, thus serving as a means of self cleaning when run through water and thereby reducing debris build-up and corrosion that tends to weaken and break the shields over time or build up to an extent that it interferes with the CV joint. As seen in FIG. 7, the protective shields are easily installed or removed by removing the u-bolt nuts 55.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A protective shield for ATV A-arm and CV joint comprising:
   a) an elongated "L" shaped plate comprising a vertical portion and a base portion, said vertical portion having a plurality of holes located along and adjacent to the intersection of said vertical portion and said base portion having a plurality of drainage holes and a plurality of mounting holes interspersed therein; and
   b) a spacer extending above said base portion located adjacent each of said mounting holes.

2. The protective shield according to claim 1 wherein said vertical portion further comprises a leading face portion and an end bent at an oblique angle outwardly relative to said face portion.

3. The protective shield according to claim 2 wherein said vertical portion further comprises a radiused end located opposite said end bent at an oblique angle.

4. The protective shield according to claim 1 wherein said base portion further comprises a tab portion extending outwardly along one edge and radiused at an end opposite said tab.

5. The protective shield according to claim 1 wherein said pairs of mounting holes are arranged to receive U-bolts and located along the path of an ATV A-arm suspension member.

6. The protective shield according to claim 1 wherein said drainage holes are arranged in progressive quarter circular rows.

7. The protective shield according to claim 5 wherein said spacer is a removable threaded stud attached to said base portion, a head portion of which is located between said base portion and said A-arm suspension member.

8. A protective shield for ATV A-arm and CV joint comprising:
   a) an elongated plate bent in an "L" shape comprising a vertical portion and a base portion, said vertical portion having a leading face with one end of said vertical portion bent at an oblique angle relative to said leading face with an opposite end having a radius and the vertical portion further having a plurality of holes located along and adjacent to the intersection of said vertical portion with said base portion having a tab portion extending outwardly along one edge, a plurality of mounting holes arranged in pairs for receiving U-bolts, and further comprises a plurality of drainage holes; and
   b) a removable spacer member attached to said base portion located intermediate each pair of said mounting holes.

9. The protective shield for ATV A-arm and CV joint according to claim 8 wherein said removable spacer is a threaded stud having a flat head portion.

10. A method for improving the washout capability of an A-arm mounted CV joint shield when attached to the A-arm suspension members of an ATV comprising the steps of:
    a) providing a protective A-arm shield having an elongated "L" shaped plate comprising a vertical portion and a base portion, said vertical portion having a plurality of holes located along and adjacent to the intersection of said vertical portion and said base portion, said base portion having a plurality of drainage openings therein arranged in such a manner so as to allow the unobstructed flow of liquids and semi-liquids around said A-arm suspension members;
    b) providing a spacer extending above the base portion and located between said A-arm shield and said A-arm suspension members; and
    c) attaching said A-arm shield to an ATV A-arm wheel suspension system in a manner whereby at least a portion of said A-arm shield having drainage opening therein covers existing apertures between and below said A-arm suspension members along at least a leading edge of said A-arm suspension system and in a manner whereby any said liquids and semi-liquids entering said A-arm shield are allowed to drain freely from said A-arm shield.

11. The method according to claim 10 includes the additional step of forcing water through said drainage openings, thereby removing solid debris lodged in and around said suspension members.

* * * * *